US012784775B1

(12) United States Patent
Dunn

(10) Patent No.: US 12,784,775 B1
(45) Date of Patent: Nov. 3, 2026

(54) REPEATED WRITE DEGRADATION MITIGATION IN A DISK DRIVE

(71) Applicants: Kabushiki Kaisha Toshiba, Kawasaki (JP); Toshiba Electronic Devices & Storage Corporation, Kawasaki (JP)

(72) Inventor: Eric R. Dunn, Cupertino, CA (US)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 19/369,071

(22) Filed: Oct. 24, 2025

(51) Int. Cl.

| | |
|---|---|
| ***G11B 20/18*** | (2006.01) |
| ***G11B 7/08*** | (2006.01) |
| ***G11B 7/126*** | (2012.01) |
| ***G11B 20/14*** | (2006.01) |
| *G11B 5/00* | (2006.01) |

(52) U.S. Cl.
CPC .............. *G11B 20/18* (2013.01); *G11B 7/081* (2013.01); *G11B 7/126* (2013.01); *G11B 20/1426* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 4,209,846 | A * | 6/1980 | Seppa | G06F 11/1024 714/54 |
| 9,390,761 | B2 | 7/2016 | Trantham | |
| 10,068,663 | B1 * | 9/2018 | Ebsen | G06F 12/0246 |
| 10,529,375 | B2 | 1/2020 | Gaertner | |
| 10,581,555 | B2 * | 3/2020 | Maeda | G06F 3/0659 |
| 11,023,352 | B2 | 6/2021 | Gaertner | |
| 11,276,431 | B1 * | 3/2022 | Popov | G11B 5/86 |
| 2003/0026017 | A1 * | 2/2003 | Chong | G11B 27/36 |
| 2016/0055881 | A1 * | 2/2016 | Cordle | G11B 5/1278 369/13.27 |
| 2016/0104514 | A1 * | 4/2016 | Burnett | G11B 19/041 369/13.02 |
| 2016/0299812 | A1 * | 10/2016 | Olbrich | G06F 12/0246 |
| 2021/0193248 | A1 * | 6/2021 | Zhang | G11C 29/783 |

* cited by examiner

*Primary Examiner* — Peter Vincent Agustin
(74) *Attorney, Agent, or Firm* — Kim & Stewart LLP

(57) ABSTRACT

Systems and methods are provided that prevent location-specific bit-error rate (BER) degradation caused by repeated writes in a heat-assisted magnetic recording (HAMR) disk drive. Write-generated media degradation for a particular write location is modeled based on various factors, such as recency of write commands to the write location, laser power associated with write commands, head fly height, and disk drive temperature. During operation, the media degradation for write locations in the disk drive is calculated based on the model, and write operations that excessively degrade write locations are deferred or postponed to allow media recovery at such write locations.

19 Claims, 11 Drawing Sheets

REPEATED WRITE DEGRADATION MITIGATION IN A DISK DRIVE

BACKGROUND

Heat-assisted magnetic recording (HAMR) is a developing technology that can significantly increase the areal density, and therefore the total data storage capacity, of the disks of a hard disk drive. HAMR involves temporarily heating the disk material during writing, which enables writing data in a smaller area on the disk. Generally, a laser included in each write head is used in the HAMR process to heat a tiny spot on the disk during the data-writing process.

One issue with HAMR is that repeated and frequent writing to a particular sector of a disk can cause degradation of the media reliability in that sector, resulting in an elevated bit-error rate for that sector. Such media degradation is generally considered to be caused by temporary protrusions of the fluids that are employed as a lubricant on the surface of a magnetic disk to protect the head-disk interface (HDI). Specifically, during the HAMR process, the high-temperature effect generated by the laser can progressively deform the lubricant layer proximate a sector of the disk, with repeated write operations to the sector of relatively high frequency causing sufficient degradation of the media surface that reduces the reliability of the written data and increases the bit-error rate of the written data. Further write operations to the sector over a short time interval can even cause permanent damage to the media surface at that sector. Thus, while the HAMR process can increase the areal density of a magnetic disk, under certain use cases, media reliability can be degraded for specific sectors of the magnetic disk, in some cases to the point of permanent damage to the sector.

In light of the above, there is a need in the art for mitigating or preventing media degradation in hard disk drives that employ HAMR.

SUMMARY

One or more embodiments provide systems and methods that prevent location-specific bit-error rate (BER) degradation caused by repeated writes in a HAMR disk drive. In the embodiments, write-generated media degradation for a particular write location is modeled based on various factors, such as recency of write commands to the write location, laser power associated with write commands, head fly height, disk drive temperature, and the like. During operation, the media degradation for write locations in the disk drive is calculated based on the model, and write operations that excessively degrade write locations are deferred or postponed to allow media recovery at such write locations. In some embodiments, write operations to a particular write location are postponed by deferring the pending write operation for at least a time interval that is determined based on the media degradation model. For example, in such embodiments, write operations may be postponed until a modeled recovery time of the particular write location is less than a threshold value, indicating that the current level of media degradation has reduced sufficiently to allow further writing. In some embodiments, write operations to a particular write location are postponed by writing data associated with the write operation to a different write location on the disk, such as a media cache. In such embodiments, the write operation to a write location that currently has excessive write degradation can be avoided entirely. In some embodiments, write operations to a particular write location are postponed by storing the data associated with the write operation in an alternative storage location within the disk drive, such as a persistent write cache within the disk drive. In some embodiments, the persistent write cache can include one or more of a non-volatile solid-state memory, a protected solid-state memory included in volatile memory of the disk drive, or a reserved region in a flash memory device.

At least one advantage of some of the herein-described embodiments is that BER degradation and/or damage to disk sectors in a HAMR disk drive is prevented when repeated writes to the disk sectors are requested by a host. A further advantage of the herein-described embodiments is that such degradation and/or damage is avoided with little or no impact on performance of the disk drive.

A disk drive, according to an embodiment, includes: a magnetic head that includes a laser; a rotating magnetic recording medium associated with the magnetic head; and a controller. The controller is configured to perform the steps of: selecting a write command from a command queue for execution, wherein the write command references data to be written to the rotating magnetic recording medium; determining that an expected bit error rate in data that is to be written using the magnetic head and the laser to a first write location of the rotating magnetic recording medium and is referenced by the write command is greater than a threshold bit error rate; and in response to said determining, postponing writing of the data to the first write location.

According to an embodiment, a computer-implemented method of storing data in a magnetic disk drive includes: selecting a write command from a command queue for execution, wherein the write command references data to be written to a rotating magnetic recording medium of the magnetic disk drive; determining that an expected bit error rate in data that is to be written using a magnetic head and laser of the magnetic disk drive to a first write location of the rotating magnetic recording medium and is referenced by the write command is greater than a threshold bit error rate; and in response to said determining, postponing writing of the data to the first write location.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

System Overview

Figure 1:
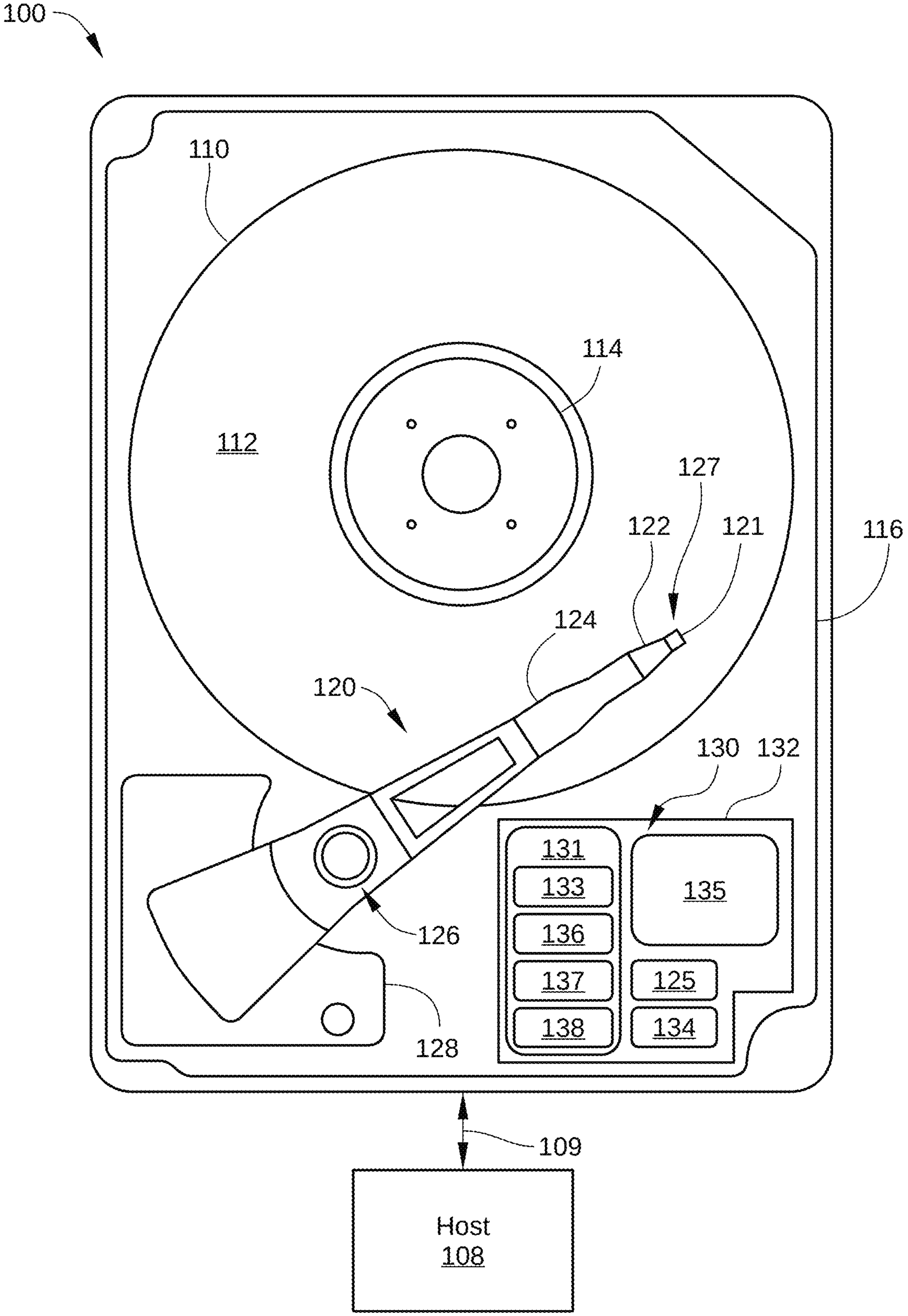
FIG. 1 is a schematic view of an exemplary hard disk drive, according to one embodiment.

FIG. 1 is a schematic view of an exemplary hard disk drive (HDD) 100, according to one embodiment. In the embodiment illustrated in FIG. 1, HDD 100 is connected to a host 108, such as a host computer, via a host interface 109, such as a serial advanced technology attachment (SATA) bus or a Serial Attached Small Computer System Interface (SAS) bus.

For clarity, HDD 100 is illustrated without atop cover. HDD 100 includes multiple storage disks 110 (only one of which is visible in FIG. 1) that each include one or two recording surfaces 112 on which a plurality of concentric data storage tracks are disposed. In FIG. 1, only the top recording surface 112 of storage disk 110 is visible. Each storage disk 110 is a rotating magnetic recording medium and is coupled to and rotated by a spindle motor 114 that is mounted on a base plate 116. An actuator arm assembly 120 is also mounted on base plate 116, and includes one or more sliders 121 (only one of which is visible in FIG. 1), each mounted on a flexure arm 122 with a magnetic read/write head 127 that reads data from and writes data to the data storage tracks of an associated recording surface 112. Each flexure arm 122 is attached to an actuator arm 124 that is rotated about a bearing assembly 126 by a voice coil motor 128. Thus, voice coil motor 128 moves all of the one or more sliders 121 radially relative to a respective recording surface 112 of a respective storage disk 110, thereby positioning a read/write head 127 over a desired concentric data storage track.

Each read/write head 127 is a magnetic head that includes a read head and a write head (not shown). The read head of each read/write head 127 is configured to generate an output signal when moving past data or servo information written to the surface of the storage disk 110 that is associated with that read/write head 127. The write head of each read/write head 127 is configured to write information to the surface of the storage disk 110 that is associated with that read/write head 127. In some embodiments, read/write head 127 includes two read elements to enable two-dimensional magnetic recording (TDMR).

To achieve higher areal density in HDD 100, each read/write head 127 of HDD 100 is configured as a heat-assisted magnetic recording (HAMR) head. Thus, in some embodiments, each read/write head 127 includes a laser for heating a microscopic area of the associated storage disk 110 when writing information onto storage disk 110. One embodiment of read/write head 127 is described below in conjunction with FIG. 2.

Figure 2:
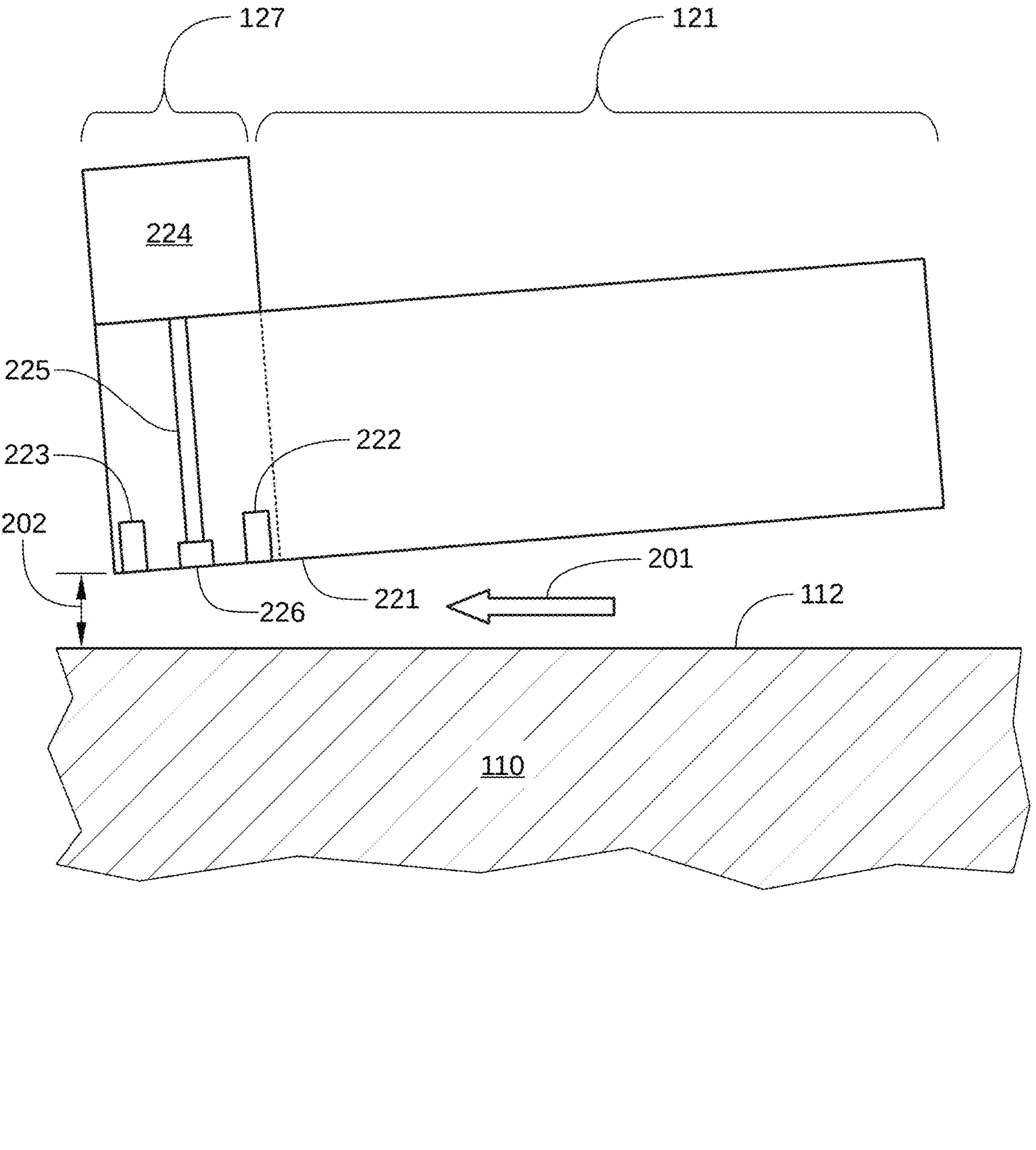
FIG. 2 schematically illustrates a read/write head of the hard disk drive of FIG. 1, according to various embodiments.

FIG. 2 schematically illustrates read/write head 127, according to various embodiments. FIG. 2 shows read/write head 127 positioned at an end of slider 121 and suspended proximate recording surface 112 of recording disk 110, which is spinning in rotational direction 201. As read/write head 127 "flies" over recording surface 112, an air-bearing surface (ABS) 221 is lifted via the pressure generated by rotation of recording disk 110. In operation, slider 121 is configured to maintain a substantially uniform fly height 202 of read/write head 127 from recording surface 112 based on various factors, such as the mass of slider 121 and read/write head 127, the current "flying velocity" of read/write head 127 relative to recording surface 112, skew angle of the actuator arm assembly 120 (shown in FIG. 1) relative to recording disk 110, the force applied to the slider by the suspension, and the like. Typically, fly height 202 is targeted to be on the order of a few nanometers or even less than a nanometer, which can be controlled in part via a dynamic fly-height (DFH) heater (not shown) disposed within or coupled to slider 121.

In the embodiment illustrated in FIG. 2, read/write head 127 includes a read element 222, a write element 223, a laser light source 224, a waveguide 225, and a near-field transducer (NFT) 226. Laser light source 224 can be a semiconductor laser or laser diode that is mounted on or attached to slider 121 and generates laser light for heating a spot on recording surface 112 proximate write element 223. Waveguide 225 guides laser light from laser light source 224 to NFT 226, which is positioned near write element 223. In some embodiments, NFT 226 is configured to convert optical energy received from waveguide 225 to heat energy within recording surface 112.

Returning to FIG. 1, spindle motor 114, read/write head 127, and voice coil motor 128 are coupled to electronic circuits 130, which are mounted on a printed circuit board 132. In some embodiments, each read/write head 127 has an associated additional actuator. The additional actuator (not shown) can be on the suspension (i.e., flexure arm 122), at the gimbal between the suspension and slider 121, or on slider 121, and can move the associated read/write head 127 radially a small distance. Such actuators are generally referred to as dual-stage actuators, and enable the servo system of HDD 100 to attain more accurate tracking control.

In the embodiment illustrated in FIG. 1, a single actuator arm assembly 120 is shown that includes only one slider 121, one flexure arm 122, one actuator arm 124, and one read/write head 127. In other embodiments, actuator arm assembly 120 includes a plurality of actuator arms 124, sliders 121, flexure arms 122, and read/write heads 127, where each read/write head 127 is associated with a different recording surface 112 of HDD 100. Further, in some embodiments, HDD 100 can include multiple actuator arm assemblies 120 that are each rotated about bearing assembly 126 by a respective VCM 128 independently from each other. In such embodiments, each actuator arm assembly 120 may each include a plurality of actuator arms 123, sliders 121, flexure arms 122, and read/write heads 127.

Electronic circuits 130 include a read/write channel 137, a microprocessor-based controller 133, random-access memory (RAM) 134 (which may be a dynamic RAM and used as one or more data buffers), a flash memory device 135, and, in some embodiments, a flash manager device 136. RAM 134 can store data associated with recently received read commands and/or write commands from host 108 and a command queue of such write commands. According to various embodiments, RAM 134 can further store a list, map, or function of monitored write locations, where each entry includes a specific write location of a storage disk 110 and an associated value indicating a level of write-generated media degradation at the write location.

In some embodiments, read/write channel 137, microprocessor-based controller 133, and/or flash manager device 136 are included in a single chip, such as a system-on-chip 131. In some embodiments, HDD 100 further includes a motor-driver chip 125 that accepts commands from microprocessor-based controller 133 and drives both spindle motor 114 and voice coil motor 128. Read/write channel 137 communicates with the read element of read/write head 127 via a preamplifier (not shown) that may be mounted on a flex-cable that is itself mounted on either base plate 116, actuator arm 120, or both. In some embodiments, HDD 100 further includes a power loss protection system 138 that is configured to store certain data in a protected solid-state memory location included in HDD 100. One embodiment of power loss protection system 138 is described below in conjunction with FIG. 3.

Figure 3:
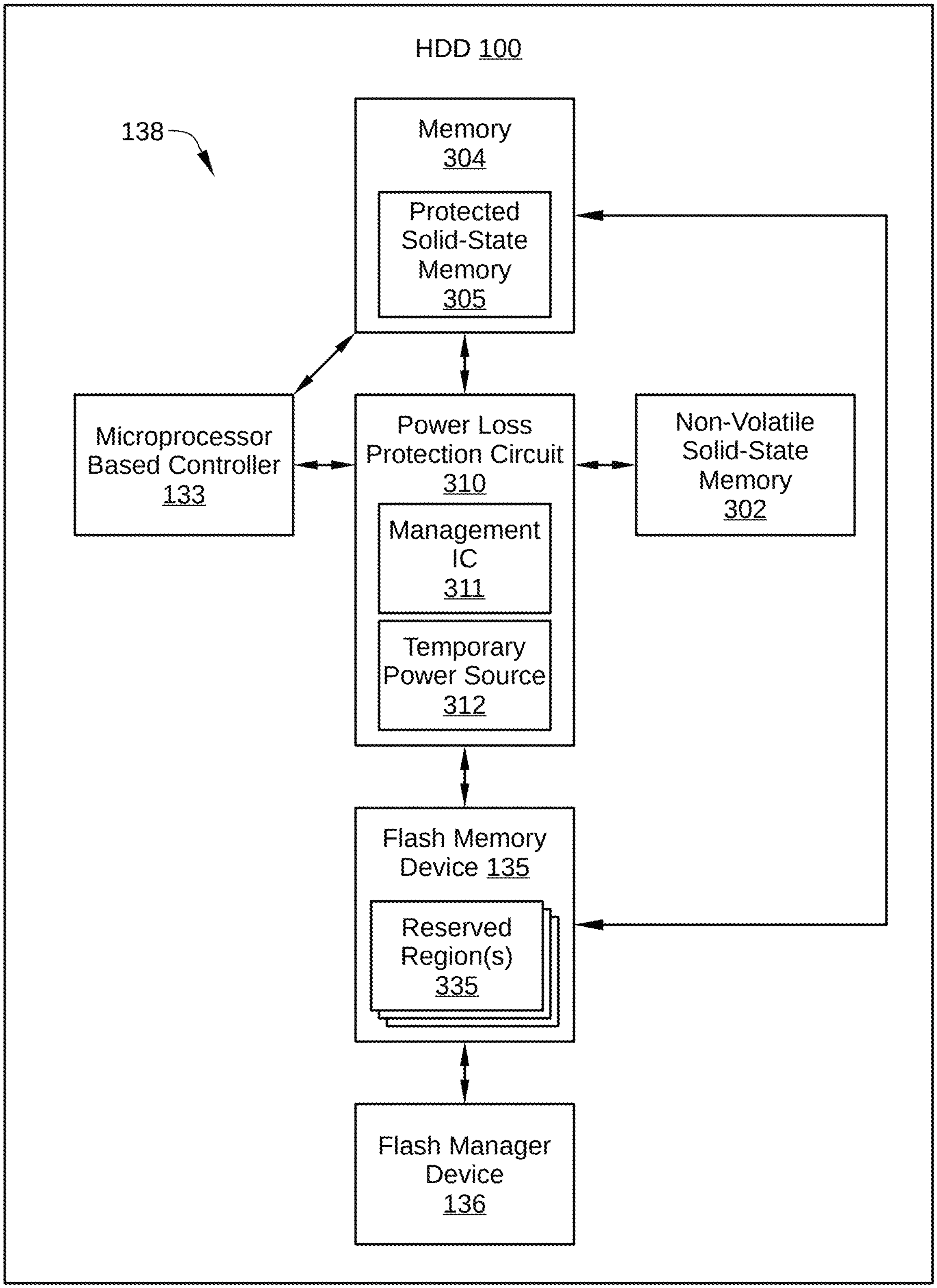
FIG. 3 is a schematic diagram of a power loss protection system of the hard disk dive of FIG. 1, according to various embodiments.

FIG. 3 is a schematic diagram of power loss protection (PLP) system 138, according to various embodiments. PLP system 138 prevents the loss of certain data stored in a memory 304 in the event of an unexpected loss of power to HDD 100 via a persistent write cache that can store write data that have been received but not yet written to a storage disk 110 of HDD 100. For example, in some embodiments, when a write command references a disk location that has an expected bit-error rate that exceeds a threshold bit-error rate due to recent repeated write operations, the persistent write cache can store write data associated with the write command. In this way, the disk location referenced by the write command can recover from the accumulated media degradation that is caused by repeated write operations during a short time interval.

In the embodiment shown in FIG. 3, PLP system 138 includes a PLP circuit 310 and memory 304, which are each communicatively coupled to microprocessor-based controller 133. In some embodiments, PLP circuit 310 and memory 304 are also communicatively coupled to flash memory device 135 and/or flash manager device 136. Alternatively or additionally, in some embodiments, PLP system 138 further includes non-volatile solid-state memory 302. In some embodiments, the persistent write cache of HDD 100 can include one or more of non-volatile solid-state memory 302, protected solid-state memory 305 in memory 304, and/or reserved regions 335 in flash memory device 135.

Non-volatile solid-state memory 302 includes one or more solid-state memory devices or chips that can store data in a non-volatile fashion. Thus, data stored in non-volatile solid-state memory 302 are not lost when HDD 100 loses power or is powered off. In some embodiments, non-volatile solid-state memory 302 includes flash memory, such as NOR flash media and/or NAND flash media. In some embodiments, non-volatile solid-state memory 302 can include ferroelectric RAM (FeRAM, F-RAM or FRAM), which is a random-access memory similar in construction to DRAM that uses a ferroelectric layer instead of a dielectric layer to achieve non-volatility. In some embodiments, non-volatile solid-state memory 302 can include any other technically feasible non-volatile solid-state memory device or devices capable of storing data that can be erased and reprogrammed, such as electrically erasable programmable read-only memory (EEPROM) devices.

Memory 304 includes one or more solid-state memory devices or chips, such as an array of volatile dynamic random-access memory (DRAM) chips. For example, in some embodiments, memory 304 includes a portion of RAM 104 shown in FIG. 1. In the embodiment illustrated in FIG. 3, memory 304 also includes a protected solid-state memory 305. In some embodiments, in the event of unexpected power loss, PLP circuit 310 causes data in protected solid-state memory 305 to be stored in one or more reserved regions 335 in flash memory device 135 or in non-volatile solid-state memory 302. Even though protected solid-state memory 305 may be comprised entirely of volatile RAM, such as dynamic RAM, protected solid-state memory 305 can be considered nonvolatile because memory 304, microprocessor-based controller 133, flash memory device 135, and flash manager device 136 are all coupled to PLP circuit 310. Consequently, upon detection of power loss to HDD 100, data stored in protected solid-state memory 305 can be stored in one or more reserved regions 335 in flash memory device 135, and such data are not lost despite the loss of power to HDD 100.

In some embodiments, protected solid-state memory 305 includes specific memory locations in memory 304 that are automatically stored to non-volatile memory (e.g., flash memory device 135 and/or non-volatile solid-state memory 302) in response to a power loss event. Alternatively or additionally, in some embodiments, protected solid-state memory 305 includes normal memory locations in memory 304 that are volatile. In such embodiments, such normal memory locations in memory 304 operate as protected solid-state memory 305 when added to a list of protected memory locations that are automatically stored to non-volatile memory in response to a power loss event.

PLP circuit 310 is configured to power memory 304, microprocessor-based controller 133, flash memory device 135, flash manager device 136, and/or non-volatile solid-state memory 302 for a short but known time interval. Thus, in the event of unexpected power loss, PLP circuit 310 allows data stored in protected solid-state memory 305 to be copied to the one or more reserved regions 335 of flash memory device 135 and/or to non-volatile solid-state memory 302. In normal operation, memory 304 is employed as a smaller, but much faster storage device than flash memory device 135, since DRAM write operations are typically performed orders of magnitude faster than NAND write operations. Consequently, data received by HDD 100 from a host can be initially stored in memory 304 rather than in flash memory device 135. PLP circuit 310 allows some or all of memory 304 to temporarily function as non-volatile memory, and data stored therein will not be lost in the event of unexpected power loss to data storage system 100. As shown, PLP circuit 310 includes a management integrated circuit (IC) 311 and a temporary power source 312.

Management IC 311 is configured to monitor an external power source (not shown) and temporary power source 312, and to alert microprocessor-based controller 133 of the status of each. Management IC 311 is configured to detect interruption of power from the external power source, to alert microprocessor-based controller 133 of the interruption of power, and to switch temporary power source 312 from an "accept power" mode to a "provide power" mode. Thus, when an interruption of power from the external power source is detected, HDD 100 can continue to operate for a finite time, for example a few seconds or minutes, depending on the charge capacity of temporary power source 312. During such a time, microprocessor-based controller 133 can copy data stored in memory 304 (for example in protected solid-state memory 305) to reserved regions 335 of flash memory device 135 and/or in non-volatile solid-state memory 302. In some embodiments, upon power restoration from the external power source, management IC 311 is further configured to copy data stored in reserved regions 335 or in non-volatile solid-state memory 302 back to memory 304.

Temporary power source 312 may be any technically feasible device capable of providing electrical power to memory 304, microprocessor-based controller 133, flash memory device 135, flash manager device 136, and/or non-volatile solid-state memory 302 for a finite period of time, as described above. Suitable devices includes rechargeable batteries, dielectric capacitors, and electrochemical capacitors (also referred to as "supercapacitors"). Alternatively or additionally, in some embodiments, temporary power source 312 includes spindle motor 114 (shown in FIG. 1), where spindle motor 114 temporarily acts as a generator that uses rotational inertia of storage disks 110 in the case of unexpected power loss.

Returning to FIG. 1, when data are transferred to or from a particular storage disk 110 of HDD 100, actuator arm assembly 120 moves in an arc between the inner diameter (ID) and the outer diameter (OD) of a particular storage disk 110. Actuator arm assembly 120 accelerates in one angular direction when current is passed in one direction through the voice coil of VCM 128 and accelerates in an opposite direction when such current is reversed, thereby allowing control of the position of actuator arm assembly 120 and the attached read/write head 127 with respect to the particular storage disk 110. VCM 128 is coupled with a servo system that uses the positioning data read from servo wedges on storage disk 110 by read/write head 127 to determine the position of read/write head 127 over a specific data storage track. For example, the servo system may position read/write head 127 over recording surface 112 based on positioning data read from recording surface 112.

In positioning a read/write head 127 over a recording surface 112, the servo system determines an appropriate current to drive through the voice coil of voice coil motor 128, and drives said current using a current driver and associated circuitry. Typically, the appropriate current is determined based in part on a position feedback signal of the read/write head 127, such as a position error signal (PES). The PES is typically generated by using servo patterns included in servo wedges on recording surface 112 as a reference. One embodiment of recording surface 112 and associated servo patterns is illustrated in FIG. 4.

Figure 4:
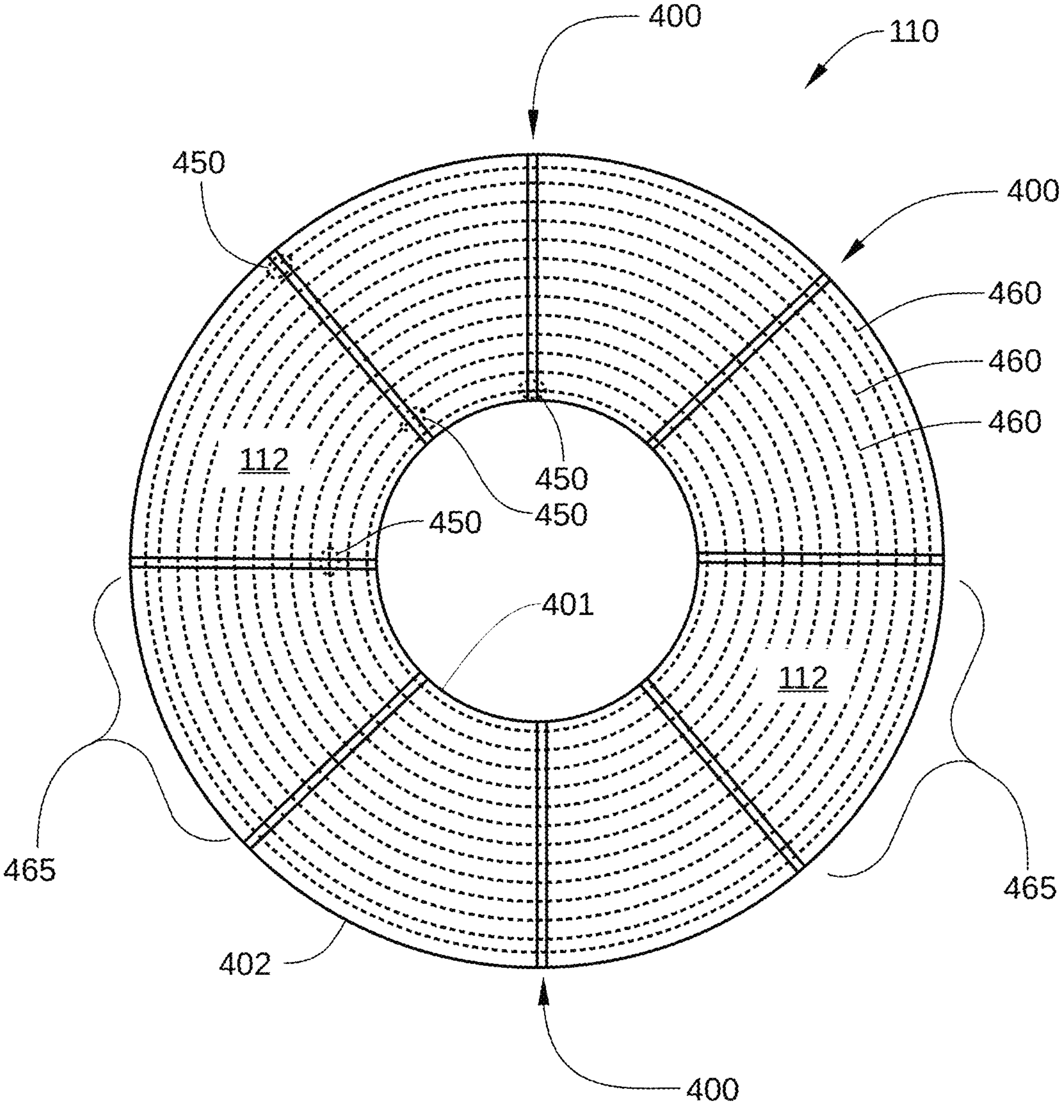
FIG. 4 schematically illustrates a recording surface of a storage disk with servo wedges and concentric data storage tracks formed thereon, according to an embodiment.

FIG. 4 schematically illustrates a recording surface 112 of a storage disk 110 with servo wedges 400 and concentric data storage tracks 460 formed thereon, according to an embodiment. Each servo wedge 400 includes a plurality of servo sectors 450 containing servo patterns and/or other servo information that defines the radial position and track pitch, i.e., spacing, of data storage tracks 460. Servo wedges 400 are written on recording surface 112 via a self-servo-write (SSW) process (described below) in which the servo system of HDD 100 positions a read/write head 127 based on servo spirals previously written on recording surface 112 and writes final product servo patterns on recording surface 112 for each data storage track 460. Servo wedges 400 for each data storage track 460 may be substantially radially aligned, as shown. In practice, servo wedges 400 may also be somewhat curved. For example, servo wedges 400 may be configured to mirror the path that would be followed by read/write head 127 if read/write head 127 were to be moved across the stroke of actuator arm assembly 120 while storage disk 110 is not spinning. Such a curved pattern advantageously results in the wedge-to-wedge timing being independent of the radial position of read/write head 127. For simplicity, servo wedges 400 are depicted as substantially straight lines in FIG. 4.

Data storage tracks 460 are formed on recording surface 112 between an ID 401 and an OD 402 of storage disk 110. Data storage tracks 460 for storing data are located in data sectors 465 as shown, and the radial position of each data storage track 460 is defined by the servo information written in servo sectors 450 for that data storage track 460. More specifically, each servo sector 450 for a particular data storage track 460 contains servo information that is read by read/write head 127 during read and write operations to position read/write head 127 above that particular data storage track 460. Typically, the actual number of data storage tracks 460 and servo wedges 400 included on recording surface 112 is considerably larger than illustrated in FIG. 4. For example, recording surface 112 may include hundreds of thousands of concentric data storage tracks 460 and hundreds of radially aligned servo wedges 400.

In some embodiments, recording surface 112 may include a media-cache region for storing media-cache entries during normal operation of HDD 100. Embodiments of a media-cache region of recording surface 112 are illustrated in FIG. 5.

Figure 5:
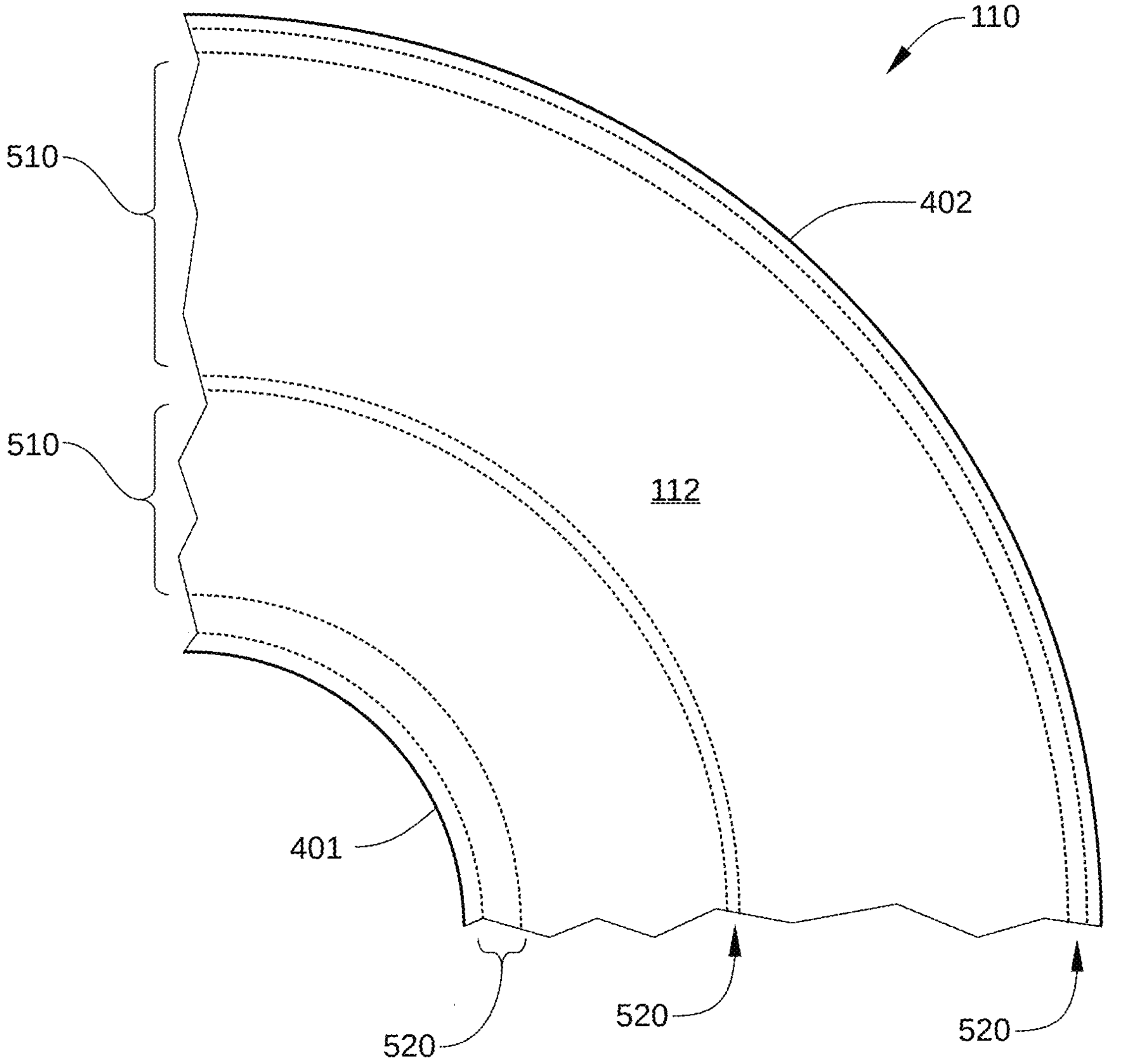
FIG. 5 schematically illustrates a user region of a recording surface of a storage disk and media-cache regions of the recording surface, according to an embodiment.

FIG. 5 schematically illustrates a user region 510 of a recording surface 112 and media-cache regions 520 of the recording surface 112, according to an embodiment. For clarity, data storage tracks formed on recording surface 112 are not shown in FIG. 5. As shown, recording surface 112 can include multiple media-cache regions 520 at multiple radii across the disk. For example, in the embodiment illustrated in FIG. 5, recording surface 112 includes a media cache region 520 disposed proximate OD 402 of recording surface 112, a media cache region 520 disposed proximate ID 401 of recording surface 112, and a media cache region 520 disposed proximate a middle diameter region of recording surface 112. In other embodiments, recording surface 112 includes a single media cache region 520, two media cache regions 520, or four or more media cache regions 520. Generally, user region 510 includes the majority of the storage capacity of recording surface 112, while the one or more media cache regions 520 are employed to facilitate operation of HDD 100, for example by caching certain write data.

Repeated Write Degradation Model in a HAMR Disk Drive

As noted previously, in a disk drive that employs HAMR, repeated and frequent writing of data to a particular data sector (e.g., a data sector 465 in FIG. 4) can cause media degradation of that data sector that results in a significant increase in bit error-rate (BER). Such media degradation has been observed to recover over time when the repeated writing to the data sector stops before some threshold level of degradation has occurred. Thus, the media degradation of a particular data sector in a HAMR disk drive is generally not permanent. Instead, the media degradation for a particular data sector monotonically decreases over time until, after a complete recovery interval ($I_{recover}$), the BER of the particular data sector is indistinguishable from the BER of a data sector that has not been written to. This effect is described below in conjunction with FIGS. 6 and 7.

Figure 6:
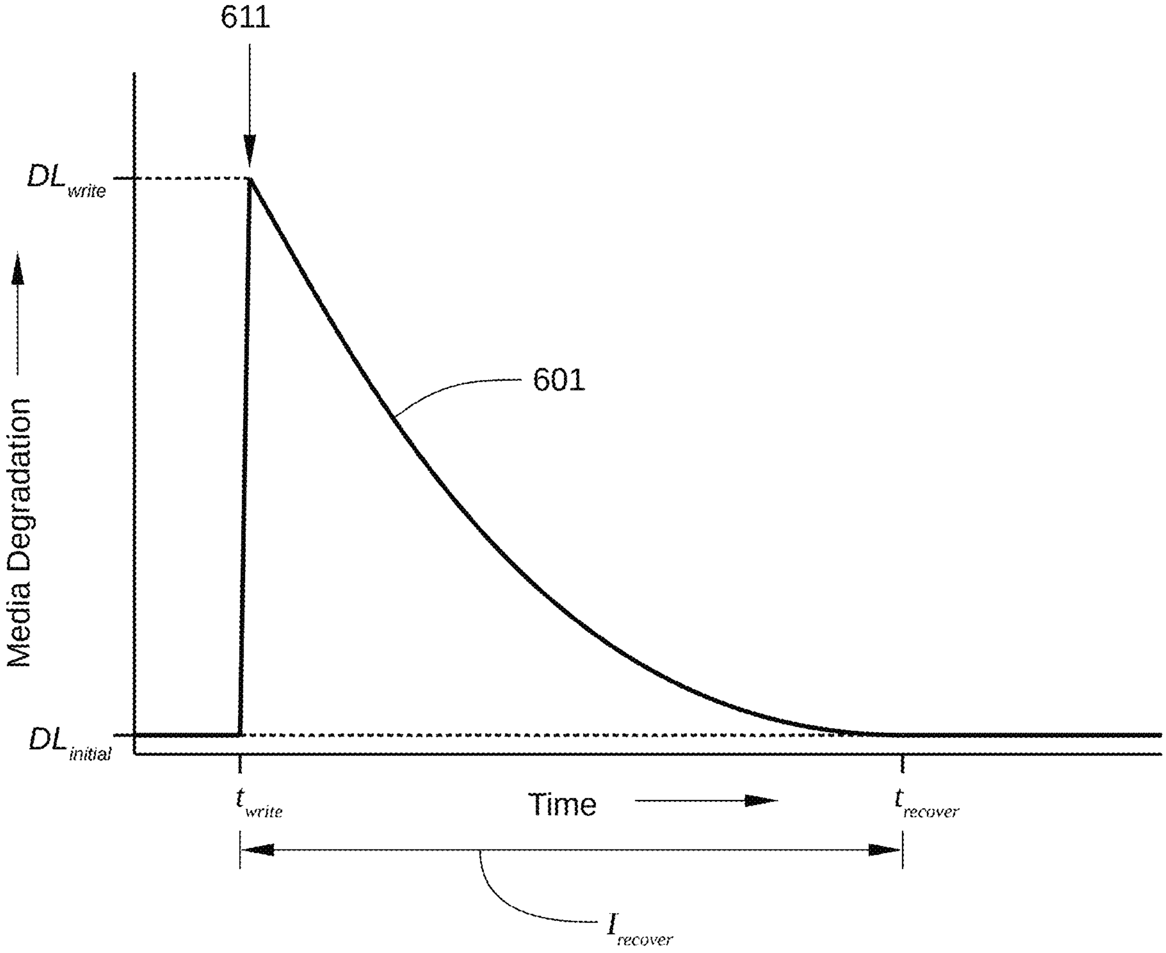
FIG. 6 is a plot depicting the media degradation over time of a particular write location of a hard disk drive when a single heat-assisted magnetic recording (HAMR) write operation is performed at the write location, according to various embodiments.

FIG. 6 is a plot depicting the media degradation over time of a particular write location of HDD 100 when a single HAMR write operation 601 is performed at the write location, according to various embodiments. In FIG. 6, media degradation can be quantified via any suitable disk drive performance metric, such as BER at the write location and/or various measurements related to the head-disk interface (HDI) at the write location, such as head fly height, clearance between the head and the disk lubricant layer, touchdown detection, and the like. The write location receiving the write commands in FIG. 6 can be a specific data sector, a group of contiguous data sectors, a data storage track, a group of contiguous data storage tracks, a cylinder (vertical stack of tracks across all storage disks 110 of HDD 100), or a group of contiguous cylinders. This is because a write operation employing a HAMR process can in some instances potentially cause media degradation in regions of a storage disk adjacent or proximate to the actual write location.

As shown, when HAMR write operation 611 is performed on the write location at write time $t_{write}$, media degradation 601 increases from an initial degradation level $DL_{initial}$ to a write degradation level $DL_{write}$, where initial degradation level $DL_{initial}$ corresponds to a level of media degradation of a write location that has not been written to using a HAMR process. Media degradation 601 then decreases monotonically over time until reaching initial degradation level $DL_{initial}$ (or a level of media degradation that is substantially indistinguishable from initial degradation level $DL_{initial}$) at a recovery time $t_{recover}$. As indicated in FIG. 6, media degradation 601 decreases from write degradation level $DL_{write}$ to initial degradation level $DL_{initial}$ over a time interval referred to herein as a recovery interval $I_{recover}$, where $I_{recover}=(t_{recover}-t_{write})$. It is noted that recovery interval $I_{recover}$ is generally not a fixed value for a given write location. Instead, recovery interval $I_{recover}$ varies as a function of write degradation level $DL_{write}$. For example, for a higher value of write degradation level $DL_{write}$, recovery interval $I_{recover}$ has a correspondingly higher value, since the time needed for the write location to recover from a higher write degradation level $DL_{write}$ is longer than the time needed for the write location to recover from a lower write degradation level $DL_{write}$. Further, when multiple write operations are performed on the write location in a time interval less than recovery interval $I_{recover}$, write degradation level $DL_{write}$ increases with each additional write operation, as shown in FIG. 7.

Figure 7:
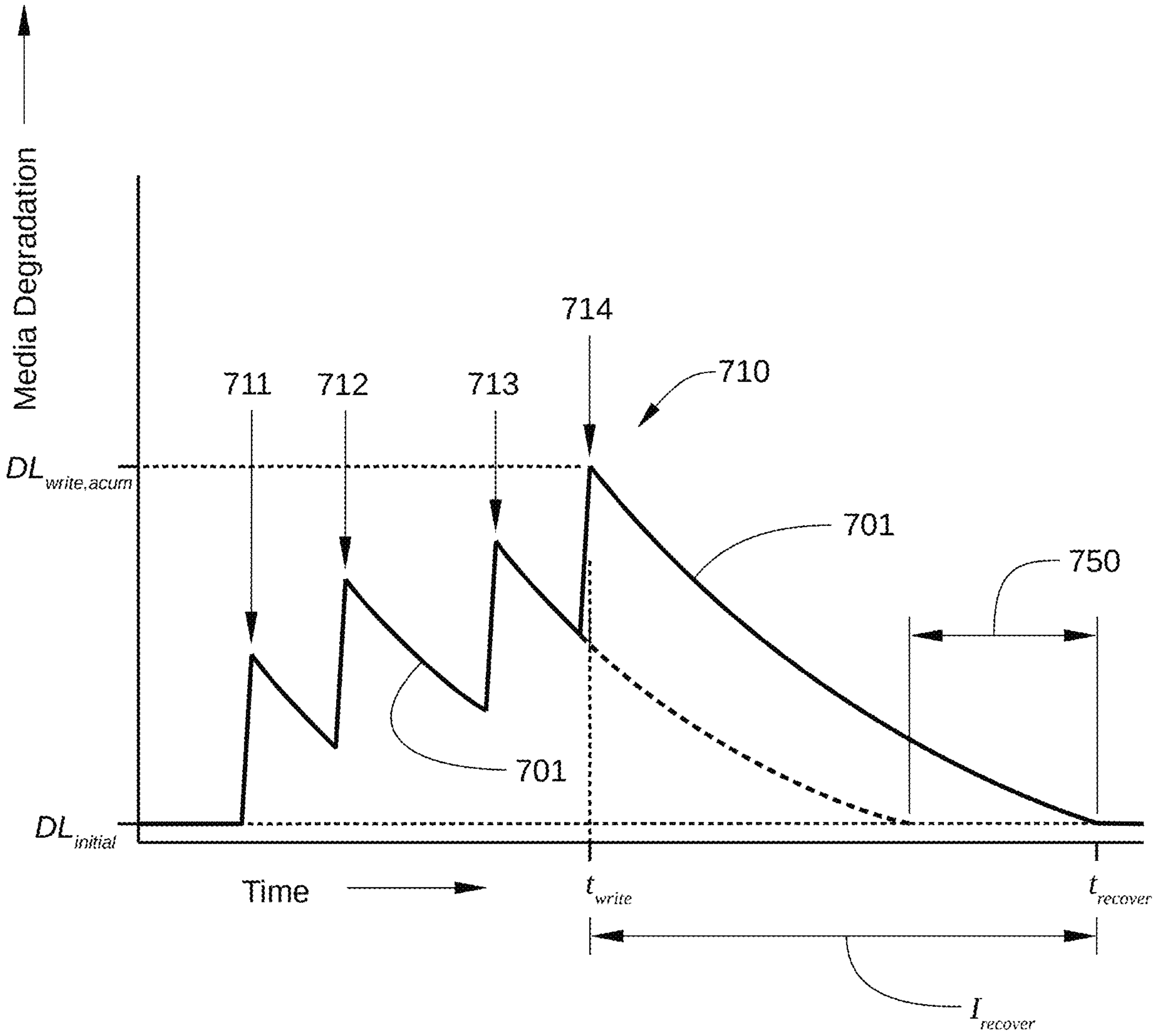
FIG. 7 is a plot depicting the media degradation of a particular write location of a hard disk drive as a function of repeated HAMR write operations being performed over time at the write location, according to various embodiments.

FIG. 7 is a plot depicting media degradation 701 of a particular write location of HDD 100 as a function of repeated HAMR write operations being performed over time at the write location, according to various embodiments. Similar to FIG. 6, in FIG. 7, media degradation 701 at the write location can be quantified via any suitable disk drive performance metric, such as BER and/or various measurements related to HDI. As shown, over time a plurality of write operations 711-714 (referred to collectively herein as write operations 710) are performed on a specific write location of a storage disk. Because a HAMR process is employed to perform each write operation at the write location, media degradation 701 of the write location accumulates with repeated write operations.

Between individual write operations 710, media degradation 701 recovers over time, as indicated by the downward slope of media degradation 701 after each write operation 710. In the instance illustrated in FIG. 7, write operation 714 is a final write operation that is performed on the write location. Therefore, after write operation 714 takes place at write time $t_{write}$, media degradation 701 monotonically decreases over recovery interval $I_{recover}$, starting from an accumulated write degradation level $DL_{write,accum}$. At the end of recovery interval $I_{recover}$ (which occurs at recovery time $t_{recover}$), media degradation 701 reaches an initial degradation level $DL_{initial}$. It is noted that because accumulated write degradation level $DL_{write,accum}$ is significantly greater than the write degradation level $DL_{write}$ associated with a single write operation (shown in FIG. 6), recovery interval $I_{recover}$ in FIG. 7 is longer in duration than recovery interval $I_{recover}$ in FIG. 6. In general, recovery time $t_{recover}$ remains fixed for the write location until additional write operations are performed on the write location. As more write operations 710 are performed on the write location, recovery time $t_{recover}$ advances to a point later in time. Thus, for each new write operation 710 that is performed on the write location, recovery time $t_{recover}$ is increased by an added time value 750 that is added to the previous value for recovery time $t_{recover}$, where added time value 750 corresponds to the level of media degradation accumulated at the write location as a result of performing the new write operation.

In FIGS. 6 and 7, media degradation that accumulates at the write location recovers over time to initial degradation level $DL_{initial}$. An exception to this behavior is when sufficient media degradation has accumulated at the write location such that permanent media damage has occurred at the write location, as shown in FIG. 8.

Figure 8:
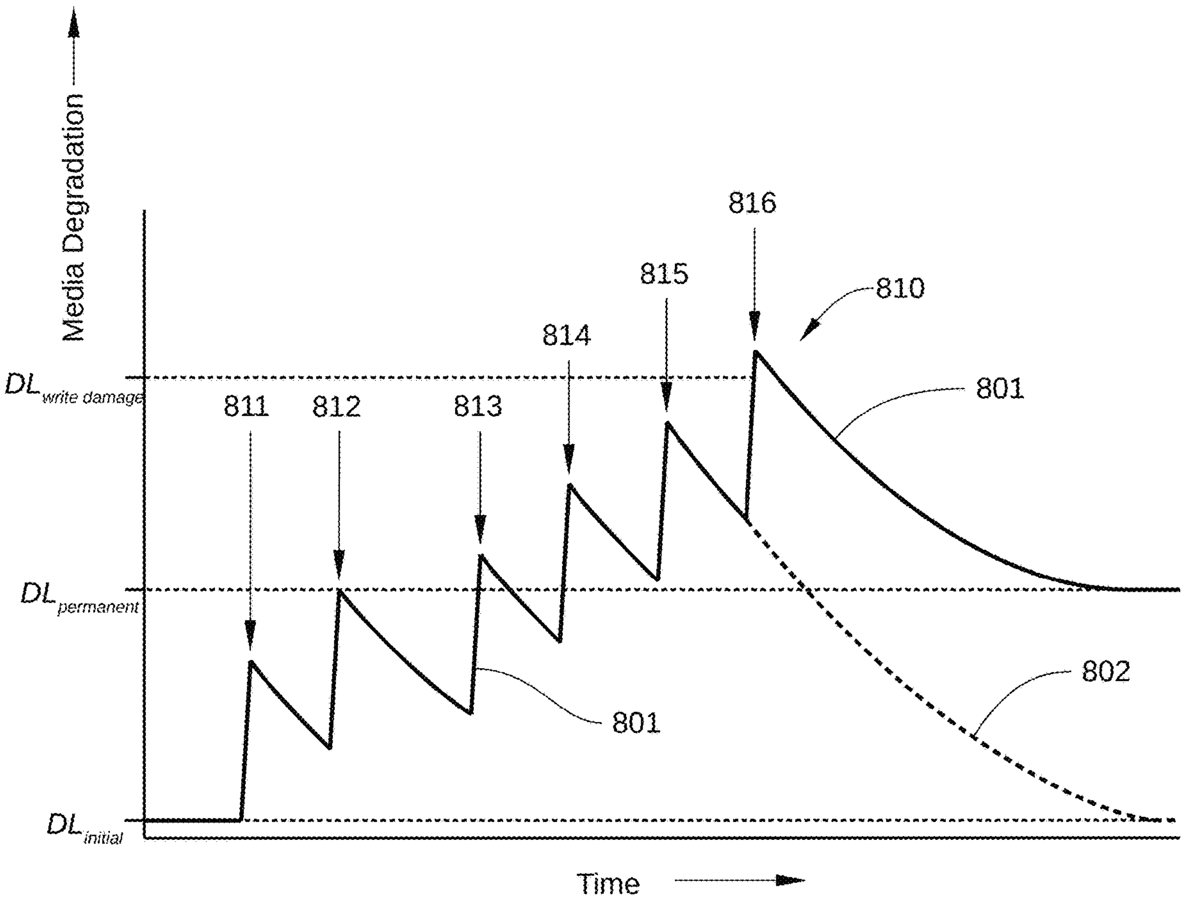
FIG. 8 is a plot depicting the media degradation of a particular write location of a hard disk drive when repeated HAMR write operations result in permanent media damage at the write location, according to various embodiments.

FIG. 8 is a plot depicting media degradation 801 of a particular write location of HDD 100 when repeated HAMR write operations result in permanent media damage at the write location, according to various embodiments. Similar to FIG. 7, in FIG. 8, media degradation 801 at the write location can be quantified via any suitable disk drive performance metric, such as BER and/or various measurements related to HDI. Further, media degradation 801 of the write location aggregates when a plurality of write operations 811-816 (referred to collectively herein as write operations 810) are performed on a specific write location of a storage disk. As shown, media degradation 801 increases with each write operation and decreases between individual write operations 810.

Unlike the instance illustrated in FIG. 7, sufficient media degradation 801 can accumulate at the write location from write operations 810 such that permanent media damage occurs at the write location. For example, in FIG. 8, write operation 816 causes media degradation 801 to exceed a threshold degradation level $DL_{write,damage}$ from which media degradation 801 does not fully recover to initial degradation level $DL_{initial}$. Instead, media degradation 801 at the write location partially recovers to a permanent degradation level $DL_{permanent}$. As a result, the write location is compromised and operates with an elevated BER and/or has other reliability issues. By contrast, if write operation 816 is not performed as shown, and write operation 815 is the last write operation performed at the write location, media degradation 801 does not exceed threshold degradation level $DL_{write\ damage}$, and can recover to initial degradation level $DL_{initial}$, as indicated by recovery trajectory 802 (dashed line).

In FIG. 8, a threshold degradation level $DL_{write\ damage}$ is described from which media degradation at a write location does not fully recover to initial degradation level $DL_{initial}$ and instead partially recovers to permanent degradation level $DL_{permanent}$. In practice, the accumulation of media degradation to a lower threshold than degradation level $DL_{write\ damage}$ in FIG. 8 can also cause problems, even though permanent media degradation does not accumulate at the write location. One embodiment of such a media degradation threshold is described below in conjunction with FIG. 9.

Figure 9:
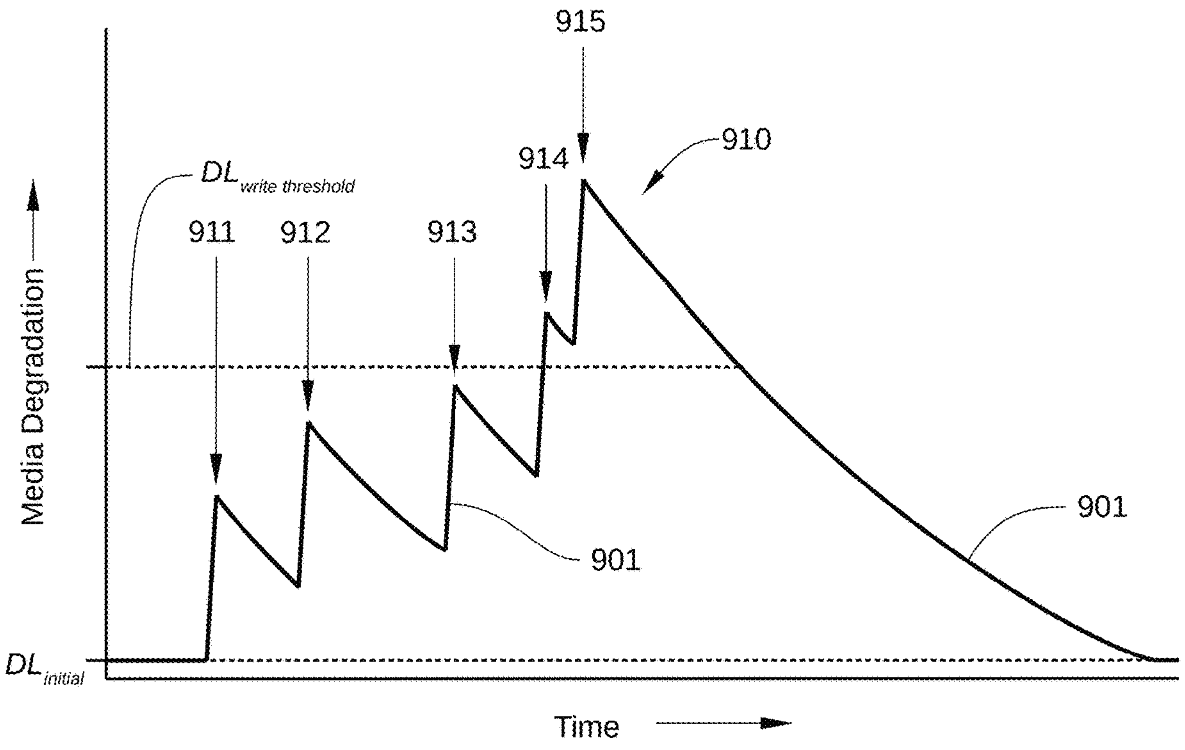
FIG. 9 is a plot depicting a media degradation of a particular write location of a hard disk drive when repeated HAMR write operations are performed at the write location, according to various embodiments.

FIG. 9 is a plot depicting a media degradation 901 of a particular write location of HDD 100 when repeated HAMR write operations are performed at the write location, according to various embodiments. Similar to FIG. 8, in FIG. 9 media degradation 901 at the write location can be quantified via any suitable disk drive performance metric. Further, media degradation 901 of the write location aggregates when a plurality of write operations 911-915 (referred to collectively herein as write operations 910) are performed on a specific write location of a storage disk over a relatively short time interval. As shown, media degradation 901 increases with each write operation and decreases over time between individual write operations 910.

In the instance illustrated in FIG. 9, a degradation level $DL_{write\ threshold}$ is shown. Degradation level $DL_{write\ threshold}$ indicates an amount of media degradation at which written data is more difficult to read due to poor write quality caused by the media degradation. Thus, when data are written to the write location while media degradation has accumulated to a level above degradation level $DL_{write\ threshold}$, a BER of the written data can be expected to exceed an acceptable value for data stored by an HDD. As a result, the data written under such conditions may require multiple read operations to be read, or may be unreadable. In general, degradation level $DL_{write\ threshold}$ is a lower threshold of media degradation than degradation level $DL_{write\ damage}$ in FIG. 8.

In the instance illustrated in FIG. 9, the data written to the write location via write operation 911 can be expected to have a normal BER, since write operation 911 is performed on the write location when the write location has a media degradation level of initial degradation level $DL_{initial}$. Similarly, the data written to the write location via write operation 912 and write operation 913 can also be expected to have an acceptable BER, since write operation 912 and write operation 913 are each performed on the write location when the write location has a media degradation level that is less than degradation level $DL_{write\ threshold}$, and the performance of these write operations is not expected to cause the media degradation of the write location to increase above degradation level $DL_{write\ threshold}$. By contrast, the data written to the write location via write operation 915 can be expected to be at risk of having an unacceptably high BER, because performance of write operation 915 takes place while the media degradation of the write location is already above degradation level $DL_{write\ threshold}$. In some situations, the data written to the write location via write operation 914 can also be expected to be at risk of having an unacceptably high BER, because performance of write operation 914 causes the media degradation of the write location to increase above degradation level $DL_{write\ threshold}$. It is noted that the elevated BER of the data written to the write location via write operation 914 and write operation 915 can be expected to remain elevated, even though the media degradation of the write location recovers to initial degradation level $DL_{initial}$.

According to various embodiments, write-generated media degradation of a write location within an HDD (such as media degradation 901) is monitored as write operations are performed on the write location. When an additional write operation is received for the write location, write-generated media degradation is prevented from reaching a level at the write location that can degrade the quality of the data written to the write location. In the embodiments, an HDD determines whether the additional write operation can cause media degradation at the write location that exceeds threshold degradation level $DL_{write\ threshold}$. In some embodiments, the media degradation for a recent write location is calculated based on a media degradation model, and a write operation that excessively degrades a write location is deferred or postponed to allow media recovery at the write location. An example embodiment of such a media degradation model is described below in conjunction with FIG. 10.

Figure 10:
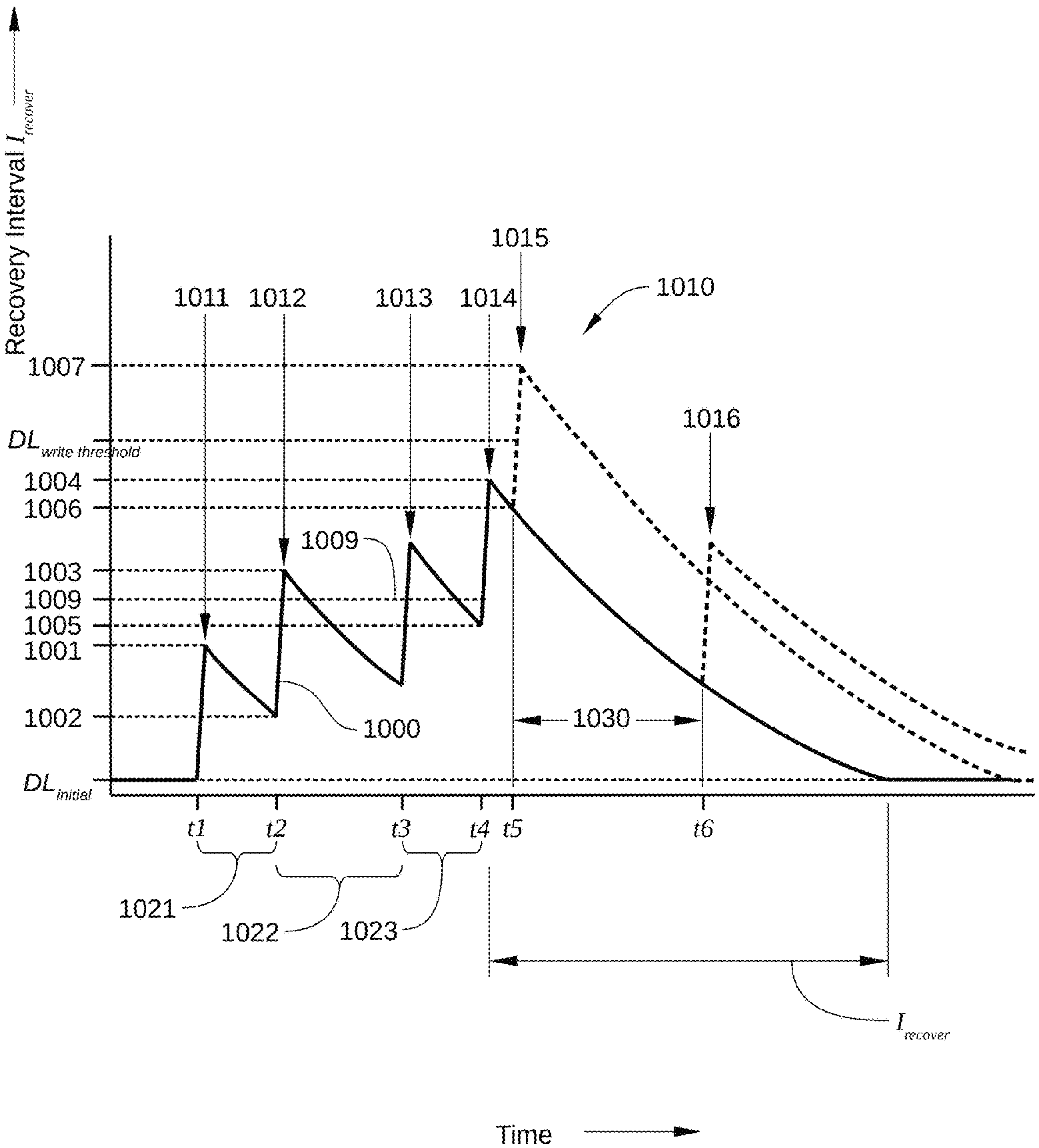
FIG. 10 is a plot depicting an output of a media degradation model when repeated HAMR write operations are performed at a write location, according to various embodiments.

FIG. 10 is a plot depicting an output 1000 of a media degradation model when repeated HAMR write operations are performed at a write location, according to various embodiments. In FIG. 10, output 1000 represents an expected media degradation accumulated at a specific write location of a storage disk when a plurality of write operations 1011-1016 (referred to collectively as write operations 1010) are performed on the write location. As shown, write operation 1011 occurs at a write time t1, write operation 1012 occurs at a write time t2, write operation 1013 occurs at a write time t3, write operation 1014 occurs at a write time t4, a proposed write operation 1015 occurs at a write time t5, and a delayed write operation 1016 is scheduled to occur at a write time t6.

In the embodiment illustrated in FIG. 10, output 1000 of the media degradation model indicates a value for a recovery interval $I_{recover}$ for the write location, where recovery interval $I_{recover}$ is an expected time interval needed for media degradation to recover to initial degradation level $DL_{initial}$ (or to a level of media degradation that is substantially indistinguishable from initial degradation level $DL_{initial}$). It is noted that, as shown in FIG. 6, there is a one-to-one correspondence between a current level of media degradation of a write location and a duration of recovery interval $I_{recover}$ for that write location to recover to initial degradation level $DL_{initial}$. Consequently, in the embodiment illustrated in FIG. 10, output 1000 can represent the expected media degradation caused by write operations as a value for a recovery interval $I_{recover}$, where output 1000 is determined using a suitable media degradation model. In other embodiments, output 1000 can represent expected media degradation using any other technically feasible metric, such as a predicted bit-error rate of the write location or the like.

As shown, output 1000 of the media degradation model increases with each write operation 1010 and decreases between individual write operations 1010. Accordingly, when write operation 1011 is performed on the write location at write time t1, output 1000 increases from initial degradation level $DL_{initial}$ to a first value 1001, which indicates an expected time interval starting at time t1 for recovery of the write location to initial degradation level $DL_{initial}$ after write operation 1011 is performed. During a time interval 1021 between write time t1 and write time t2, output 1000 decreases from first value 1001 to a second value 1002, which indicates an expected time interval starting at time t2 for recovery of the write location to initial degradation level $DL_{initial}$ if no further write operations are performed on the write location. When write operation 1012 is performed on the write location at write time t2, output 1000 increases from second value 1002 to a third value 1003 for recovery of the write location, and so on. Thus, upon completion of write operation 1014 at write time t4, output 1000 has a value 1004 for recovery of the write location. Value 1004 indicates the duration of the time interval needed for the media degradation accumulated during write operations 1011-1014 to recover to initial degradation level $DL_{initial}$, absent additional write operations being performed on the write location after write operation 1014. Consequently, value 1004 corresponds to the recovery interval $I_{recover}$ indicated in FIG. 10.

When a write operation is performed on the write location, a value for output 1000 indicates the latest level of media degradation, and is based on a media degradation model W. In some embodiments, media degradation model W is based in part on the media degradation calculated to be caused by the current write operation to be performed. For example, when write operation 1012 is performed on the write location at write time t2, media degradation model W determines that media degradation at the write location increases from second value 1002 to third value 1003. In another example, when write operation 1014 is performed on the write location at write time t4, media degradation model W determines that media degradation at the write location increases from a value 1005 to value 1004. In addition, media degradation model W is based in part on media degradation calculated to be caused by write operations previously performed on the write location. Therefore, in an embodiment in which media degradation is quantified as expected values for recovery interval $I_{recover}$, media degradation after a new write operation is performed on the write location can be determined via Equation 1:

$$I_{recover,n+1} = W(I_{recover,n}) \tag{1}$$

where $I_{recover,n+1}$ is the recovery interval after a new write operation is performed on the write location and $I_{recover,n}$ is the recovery interval before the new write operation is performed on the write location. In such embodiments, media degradation model W is based on media degradation calculated to be caused by write operations 1010 and on the recovery of media degradation calculated to occur between write operations 1010. For example, in the embodiment illustrated in FIG. 10, value 1004 is based on the media degradation associated with write operations 1011-1014 and on the duration of time intervals 1021-1023 between write operations 1011-1014.

According to various embodiments, a requested write operation can be determined to cause an expected media degradation in a write location to exceed a threshold value (degradation level $DL_{write\ threshold}$) at which data written to the write location is expected to have an unacceptable BER. For example, in the embodiment illustrated in FIG. 10, when proposed write operation 1015 is requested to be performed on the write location at time t5, output 1000 of media degradation model W is determined to increase from value 1006, which is below threshold degradation level $DL_{write\ threshold}$, to a value 1007, which is above threshold degradation level $DL_{write\ threshold}$. In response to determining value 1007 can exceed threshold degradation level $DL_{write\ threshold}$, HDD 100 postpones performing proposed write operation 1015 on the write location. As a result, output 1000 of media degradation model W does not increase to value 1007 and therefore does not exceed threshold degradation level $DL_{write\ threshold}$. Instead, in some embodiments, delayed write operation 1016 is performed at write time t6, when the media degradation of the write location has reached a value that is sufficiently below threshold degradation level $DL_{write\ threshold}$ such that performance of delayed write operation 1016 is not expected to cause the media degradation of the write location to increase above degradation level $DL_{write\ threshold}$, as shown. Various embodiments for postponing certain write operations are described below.

In the embodiment illustrated in FIG. 10, delayed write operation 1016 is performed at a time t6 such that performance of write operation 1016 does not cause media degradation of the write location to accumulate to a level above degradation level $DL_{write\ threshold}$. Thus, in the embodiment, degradation level $DL_{write\ threshold}$ indicates an amount of media degradation at which written data is more difficult to read due to poor write quality caused by the media degradation. In other embodiments, degradation level $DL_{write\ threshold}$ indicates a threshold value of media degradation that is sufficiently low that delayed write operation 1016 can be written to the write location and be expected to have an acceptable BER. Thus, in such embodiments, degradation level $DL_{write\ threshold}$ can be an eligible-for-writing value 1009. In such embodiments, delayed write operation 1016 is delayed until media degradation of the write location is determined to be equal to or less than eligible-for-writing value 1009. For example, in such embodiments, write operation 1014 can be performed on the write location at time t4 because output 1000 has a value 1005 at time t4, and value 1005 is less than eligible-for-writing value 1009.

Postponing Write Operations in a HAMR Disk Drive

In some embodiments, HDD 100 postpones performing a write operation, such as proposed write operation 1015, by deferring the write operation for at least a postponement time interval 1030 that is determined based on media degradation model W. For example, in such embodiments, write operations may be postponed until recovery interval $I_{recover}$ for the write location is less than an eligible-for-writing value 1009, where eligible-for-writing value 1009 indicates that the current level of media degradation of the write location is less than threshold degradation level $DL_{write\ threshold}$ and has reduced sufficiently to allow further writing to the write location without exceeding threshold degradation level $DL_{write\ threshold}$. Thus, in such embodiments, HDD 100 postpones performing proposed write operation 1015 for postponement time interval 1030, at which point the write location is calculated to have sufficiently recovered for additional write operations to be performed.

In some embodiments, HDD 100 postpones performing proposed write operation 1015 on the write location with a modified write-reordering process. Write-reordering, also known as input/output (I/O) scheduling, is a technique employed in HDDs to improve performance by changing the order in which randomly received write commands are executed, such as write operations 1010. Because seek time and rotational latency in HDDs are typically the slowest parts of a disk operation, the write-reordering process changes the order in which recently received write commands are performed to minimize the movement of the read/write head across the storage disks and to avoid long pauses in writing while the disk rotates into position for a particular write command. Generally, write commands are ordered based on numerous factors, such as the seek time required for moving the read/write head from the current location to perform the write command, how long the write command has been in the command queue for HDD 100, and the like. According to various embodiments, eligibility of certain write locations to be written to without risking unacceptable BER is another such factor in the modified write-reordering process. For example, in one such embodiment, a write command that references a write location with a recovery interval $I_{recover}$ that has a value greater than an eligible-for-writing value 1009 is assigned a lower priority than other write commands in the command queue and/or a priority weighting that prevents the write command from being performed before any other write commands in the command queue. In such an embodiment, the value for the recovery interval $I_{recover}$ corresponds to a time in the future that exceeds an eligibility threshold, such as eligible-for-writing value 1009. Consequently, the value for the recovery interval $I_{recover}$ indicates that performance of a write command to the write location can result in the writing of data at the write location that has unacceptable BER. In such embodiments, the modified write-reordering process ensures that a write operation is not performed on a write location that has a level of media degradation that has not recovered sufficiently to allow further writing to the write location.

In some embodiments, HDD 100 postpones performing proposed write operation 1015 on the write location by writing data associated with proposed write operation 1015 to a different write location on the disk than the write location associated with proposed write operation 1015. For example, in such embodiments, HDD 100 can write the data associated with proposed write operation 1015 to a media cache. Various examples of such a media cache are described above in conjunction with FIG. 5. In such embodiments, the writing of the data associated with proposed write operation 1015 to the write location can be avoided entirely. In such embodiments, HDD 100 includes a mechanism for logical-to-physical remapping, such as firmware included in microprocessor-based controller 133 (shown in FIG. 1) for performing such remapping and non-volatile memory for storing remapping information. Alternatively, in some embodiments, the data associated with proposed write operation 1015 can first be written to the media cache, then written to the original write location referenced by proposed write operation 1015 at a later time. For example, in one such embodiment, when HDD 100 receives a write command requesting that proposed write operation 1015 be performed on a disk sector associated with a logical block address (LBA) referenced by the write command, HDD 100 first writes the data associated with proposed write operation 1015 to the media cache. Then, after a suitable postponement time interval 1030 expires, HDD 100 writes the data associated with proposed write operation 1015 to the sector associated with the LBA referenced by the original write command. Thus, in such embodiments, the data associated with proposed write operation 1015 is cleared from the media cache and written to the designated write location at a subsequent time. Examples of such subsequent times include during startup of HDD 100, during shutdown of HDD 100, when the media cache reaches a threshold level of remaining capacity, and/or during a time interval in which HDD 100 is idle.

In some embodiments, HDD 100 postpones performing proposed write operation 1015 on the write location by storing data associated with proposed write operation 1015 in an alternative storage location within the disk drive, such as a persistent write cache within the disk drive. In some embodiments, the persistent write cache can include one or more of non-volatile solid-state memory 302, protected solid-state memory 305 in memory 304, and/or reserved regions 335 in flash memory device 135, which are all shown in FIG. 3.

Monitoring Degraded Write Locations in a HAMR Disk Drive

According to various embodiments, write-generated media degradation of a write location within a HAMR HDD is monitored as write operations are performed on the write location. To enable this process, in some embodiments an efficient method for monitoring write-generated media degradation in a plurality of write locations is employed. For example, in some embodiments, a value for a recovery time $t_{recover}$ is assigned to each write location available in the HAMR HDD. As described above, the recovery time $t_{recover}$ value for each write location indicates a time at which write-generated media degradation of the write location will be indistinguishable from an initial degradation level $DL_{initial}$ (which corresponds to the media degradation of a write location that has never undergone a HAMR writing process). For example, the value for recovery time $t_{recover}$ can correspond to a unit of time (e.g., seconds, minutes, or hours) since the most recent power-on-reset of the HDD. When a write location has no write-generated degradation, the recovery time $t_{recover}$ for that write location is the current time, and as a write location accumulates write-generated degradation, the recovery time $t_{recover}$ for that write location is updated to a time further in the future.

In general, modern HDDs include many hundreds of thousands of write locations. Over the duration of a typical recovery time $t_{recover}$, which can be a few minutes or seconds, such HDDs are capable of writing to only a very small fraction of the total number of write locations. As a result, at any point in time, the number of write locations that have accumulated write-generated degradation, and therefore have a recovery time $t_{recover}$ that is in the future, is relatively small. According to various embodiments, these recently written-to write locations of an HDD are monitored, while the vast majority of write locations in an HDD are not. To that end, in some embodiments, when a write operation in a HAMR HDD is performed on a write location with no accumulated media degradation, the write location is added to a list, map, or function of monitored write locations along with a recovery time $t_{recover}$. Alternatively, when a write operation in a HAMR HDD is performed on a write location that is already included on the list, map, or function of monitored write locations, the current value of the recovery time $t_{recover}$ for the write location is updated (changed to indicate a time further in the future) to reflect the newly accumulated media degradation at that write location. By contrast, the remaining write locations in the HDD, which make up the vast majority, are not directly monitored or included in the list, map, or function of monitored write locations.

In operation, monitoring of write locations based on an associated recovery time $t_{recover}$ includes various monitoring operations, such as finding a particular write location in a list, map, or function of write locations that have accumulated media degradation, updating the recovery time $t_{recover}$ of a particular entry in the list, map, or function when the write location for the particular entry undergoes additional media degradation, inserting a new write location into the list, map, or function when the new write location first undergoes media degradation, and/or removing an entry (e.g., a particular write location) from the list, map, or function when the recovery time $t_{recover}$ for that entry has expired. Monitoring of write locations as described herein is facilitated by such operations being performed very quickly, for example on the order of a few microseconds.

To enable the above-described monitoring operations to be performed with sufficient speed, in some embodiments a hash table can be employed as the list, map, or function in HDD 100 for monitoring write locations and associated recovery time $t_{recover}$ values. A hash table is a data structure that implements an associative array, also known as a dictionary or map. In the embodiments, the associative array maps keys to values. Further, in a hash table, the above-described monitoring operations (e.g., lookup, insertion, and deletion) have constant average time complexity, meaning that on average, the time required to perform these operations does not depend on the number of items in the list. Alternatively, in an embodiment, a tree-like data structure or associative map is employed as the list, map, or function in HDD 100 for monitoring write locations and associated recovery time $t_{recover}$ values. Examples of such data structures include a binary tree, a B-tree or its variants, a red-black tree, and the like. In some embodiments, the data structure can contain key-value pairs with unique keys, where keys are sorted by using a comparison function. In such a data structure, search, removal, and insertion operations have logarithmic complexity. Further, as a sorted list of key-value pairs, with sorting applied to the keys, such a data structure permits multiple entries with the same key. In such embodiments, the key can be the expiration time, and multiple entries (write locations) can have the same key. Alternatively, any other suitable data structure or associative map can be employed in HDD 100 for monitoring write locations and associated recovery time $t_{recover}$ values. In some embodiments, to enable quickly finding and removing any write locations that have an expired recovery time $t_{recover}$ value, the list, map, or function is ordered by expiration recovery time $t_{recover}$.

Mitigation of Repeated Write Degradation in a HAMR Disk Drive

Figure 11:
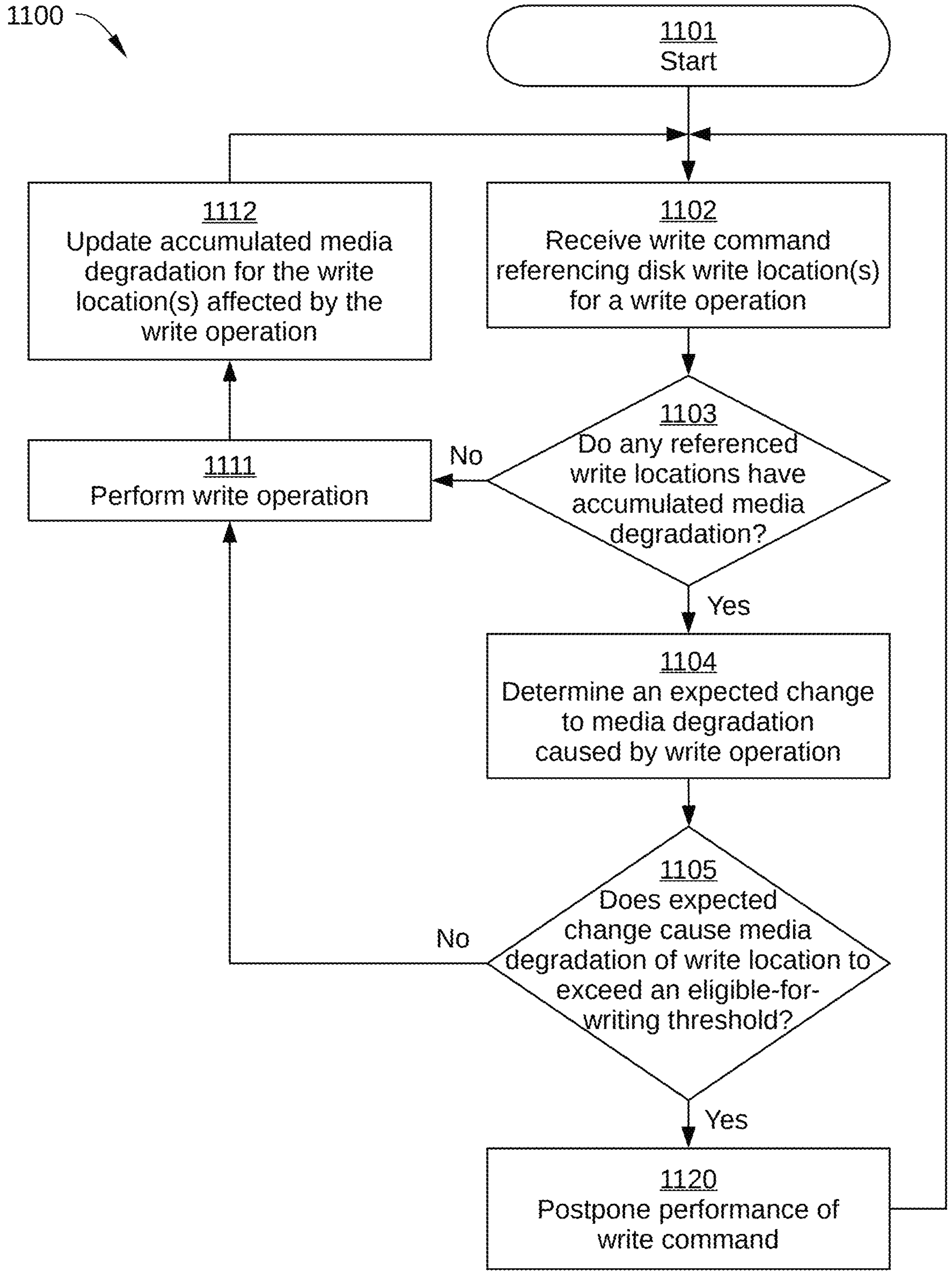
FIG. 11 sets forth a flowchart of method steps storing data in a magnetic disk drive, according to various embodiments.

FIG. 11 sets forth a flowchart of method steps for storing data in a magnetic disk drive, according to various embodiments. The method steps may include one or more operations, functions, or actions as illustrated by one or more of blocks 1101-1120. Although the blocks are illustrated in a sequential order, these blocks may be performed in parallel, and/or in a different order than those described herein. Also, the various blocks may be combined into fewer blocks, divided into additional blocks, and/or eliminated based upon a specific implementation. Although the method steps are described in conjunction with HDD 100 of FIGS. 1-10, persons skilled in the art will understand that the method steps may be performed with other types of systems. The control algorithms for the method steps may reside in microprocessor-based controller 133, some other controller associated with HDD 100, or a combination thereof. The control algorithms can be implemented in whole or in part as software- or firmware-implemented logic, and/or as hardware-implemented logic circuits.

A computer-implemented method 1100 begins at step 1101, where operation of HDD 100 starts. For example, in step 1101, HDD 100 starts up and begins communicating with host 108.

In step 1102, a suitable controller of HDD 100 receives one or more write commands from host 108, where each write command includes certain write data and references one or more write locations in HDD 100 for the write data. In some embodiments, a write location is referenced in a write command by one or more LBAs, where each LBA corresponds to a specific disk sector on a recording surface 112 of HDD 100. As noted previously, a write location can be a single data sector 465, a group of multiple contiguous data sectors 465, a single data storage track 460, a group of contiguous data storage tracks 460, a single cylinder, or a group of contiguous cylinders.

In step 1103, the controller determines whether any of the write locations referenced by the write command have accumulated media degradation. For example, in an embodiment in which accumulated media degradation is tracked based on a recovery time $t_{recover}$ for each write location, the controller determines whether the write command references one or more write locations that are currently being tracked, and therefore have a recovery time $t_{recover}$ that is later than the current time. In such an embodiment, when none of the write locations referenced by the write command have a tracked recovery time $t_{recover}$ (and therefore none of the write locations referenced by the write command have accumulated write-generated media degradation), computer-implemented method 1100 proceeds to step 1111. When one or more write locations referenced by the write command have a tracked recovery time $t_{recover}$ (and therefore have accumulated write-generated media degradation), computer-implemented method 1100 proceeds to step 1104.

In step 1104, the controller determines an expected change to the media degradation that is accumulated at the write locations associated with the write command. The expected change to the media degradation at the write locations is caused by write operations associated with the write command, and can be determined using a suitable media degradation model, such as media degradation model W. In some embodiments, media degradation model W is based on various factors. In some embodiments, a factor included in media degradation model W is the recency of write commands to the write location, which can be a measure of media degradation recovery. For example, in some embodiments, a factor included in media degradation model W is the difference between the current time and the recovery time $t_{recover}$ of a write location before the write operation is performed. Additionally or alternatively, in some embodiments, other factors on which media degradation model W is based includes a laser power associated with the write operation to be performed on the write location, a head fly height during performance of the write operation, a temperature of HDD 100, a write current used to perform the write operation on the write location, the specific read/write head 127 that performs the write operation, the specific data storage track 460 associated with the write location, an age of HDD 100, and/or the write power on hours (WPOH) of the specific read/write head 127 that performs the write operation.

In some embodiments, the expected change to the media degradation that is determined in step 1104 is expressed as a time value that is added to the current recovery time $t_{recover}$ of a write location. For example, in some embodiments, the time value that is added to the current recovery time $t_{recover}$ of the write location corresponds to added time value 750 in FIG. 7. In such embodiments, the time value corresponds to a certain level of media degradation, such as BER. In other embodiments, the expected change to the media degradation determined in step 1104 can be any other measure of write-generated media degradation of a write location, such as an expected increase in BER.

In step 1105, the controller determines whether the expected change to the media degradation determined in step 1104 can cause media degradation of a write location to exceed an eligible-for-writing threshold. For example, in an embodiment in which accumulated media degradation is tracked based on a recovery time $t_{recover}$ for each write location, the controller determines whether the expected change to the media degradation determined in step 1104 can cause the recovery time $t_{recover}$ for any affected write location to exceed eligible-for-writing value 1009, as shown in FIG. 10. In such an embodiment, when the expected change to the media degradation determined in step 1104 causes recovery time $t_{recover}$ for none of the write locations affected by the write operation to exceed eligible-for-writing value 1009, computer-implemented method 1100 proceeds to step 1111. When the expected change to the media degradation determined in step 1104 causes recovery time $t_{recover}$ for one or more of the write locations affected by the write operation to exceed eligible-for-writing value 1009, computer-implemented method 1100 proceeds to step 1120.

In step 1111, the controller performs the write operation associated with the referenced write locations. Thus, the data included in the write command received in step 1102 are written to the write location(s) referenced by the write command.

In step 1112, the controller updates the accumulated media degradation for the write locations affected by the write operation performed in step 1111. In embodiments in which accumulated media degradation is tracked based on a recovery time $t_{recover}$ for each write location, the controller adds a time value to the tracked recovery time $t_{recover}$ for each write location affected by the write operation performed in step 1111. In such embodiments, for each write location affected by the write operation, an existing entry in a list, map, or function of monitored write locations is updated with a new time value that reflects the time value being added to the recovery time $t_{recover}$ for the write location. In instances in which a write location affected by the write operation is not already included in the list, map, or function of monitored write locations, a new entry is added to the list, map, or function of monitored write locations. It is noted that expired entries in the list, map, or function of monitored write locations can be removed periodically based on the recovery time $t_{recover}$ indicated for a write location, thereby preventing the list, map, or function of monitored write locations from becoming too large. After the controller updates the list, map, or function of monitored write locations, computer-implemented method 1100 returns to step 1102.

Step 1120 is performed in response to the controller determining that an expected change in media degradation can cause media degradation of a write location to exceed a threshold value. In step 1120, the controller postpones performance of the write command received in step 1102, and computer-implemented method 1100 returns to step 1102.

In some embodiments, HDD 100 postpones performing write operations associated with the write command by deferring the write operation for at least a postponement time interval, such as postponement time interval 1030 in FIG. 10. For example, in one such embodiment, the write operation is assigned an additional write-reordering weight during postponement time interval 1030 that prevents performance of the write operation. Thus, until postponement time interval 1030 expires, the write operation has a lower priority than other write commands in a command queue of HDD 100. Upon expiration of postponement time interval 1030, the write operation is no longer assigned the additional write-reordering weight, and can be assigned a position in the command queue for HDD 100 normally.

In some embodiments, HDD 100 postpones performing write operations associated with the write command by writing data associated with the write operations to be postponed to a different write location on the disk than those referenced by the write command. For example, in such embodiments, HDD 100 can write the data associated with the write operations to be postponed to a media cache.

In some embodiments, HDD 100 postpones performing write operations associated with the write command by storing data associated with the write operations to be postponed in an alternative storage location within HDD 100, such as a persistent write cache within the disk drive. As noted previously, the persistent write cache can include one or more of non-volatile solid-state memory 302, protected solid-state memory 305 in memory 304, and/or reserved regions 335 in flash memory device 135, which are all shown in FIG. 3.

While the foregoing is directed to embodiments of the present invention, other and further embodiments of the invention may be devised without departing from the basic scope thereof, and the scope thereof is determined by the claims that follow.

I claim:

1. A disk drive, comprising:

a magnetic head that includes a laser;

a rotating magnetic recording medium associated with the magnetic head; and a controller configured to perform the steps of:

selecting a write command from a command queue for execution, wherein the write command references data to be written to the rotating magnetic recording medium;

determining that an expected bit error rate in data that is to be written using the magnetic head and the laser to a first write location of the rotating magnetic recording medium and is referenced by the write command is greater than a threshold bit error rate; and in response to said determining, postponing writing of the data to the first write location.

2. The disk drive of claim 1, wherein determining that the expected bit error rate in data to be written to the first write location is greater than a threshold bit error rate comprises determining that performing the write command can cause a level of media degradation for the first write location to exceed a maximum allowable degradation level.

3. The disk drive of claim 1, wherein determining that the expected bit error rate in data to be written to the first write location is greater than a threshold bit error rate comprises determining that performing the write command can cause a time value associated with the first write location to exceed a threshold value.

4. The disk drive of claim 3, wherein the time value associated with the first write location comprises a recovery time at which media degradation of the first write location returns to a base degradation level.

5. The disk drive of claim 3, wherein determining that the expected bit error rate in data to be written to the first write location is greater than a threshold bit error rate further comprises determining an added time value.

6. The disk drive of claim 5, wherein the added time value corresponds to a level of media degradation for the first write location caused by performing the write command.

7. The disk drive of claim 3, wherein the time value associated with the first write location is based on:

first media degradation for the first write location that is caused by writing of initial data to the first write location prior to selecting the write command from the command queue for execution; and second media degradation for the first write location that is expected to be caused by writing of the data to the first write location.

8. The disk drive of claim 7, wherein the time value associated with the first write location is further based on a time interval between the writing of the initial data to the first write location and the writing of the data to the first write location.

9. The disk drive of claim 3, wherein determining that performing the 9 write command can cause the time value associated with the first write location to exceed a threshold value comprises retrieving a previous time value associated with the first write location from one of a list, a map, or a function of monitored write locations that have accumulated media degradation.

10. The disk drive of claim 1, wherein postponing writing of the data to the first write location comprises performing a second write command that references a second write location on the rotating magnetic recording medium prior to performing the write command.

11. The disk drive of claim 1, wherein postponing writing of the data to the first write location comprises:

initially storing the data in an alternative storage location within the disk drive; and subsequently writing the data to the first write location.

12. The disk drive of claim 11, wherein storing the data in an alternative storage location comprises at least one of writing the data to a second write location on the rotating magnetic recording medium that is different than the first write location, and writing the data to a persistent cache included in the disk drive.

13. The disk drive of claim 12, wherein the persistent cache comprises at least one of a non-volatile solid-state memory, a protected solid-state memory, and a reserved region in a flash memory device of the disk drive.

14. The disk drive of claim 1, wherein writing of the data to the first write location comprises performing a heat-assisted magnetic recording process on the first write location.

15. A computer-implemented method of storing data in a magnetic disk drive, said method comprising:

selecting a write command from a command queue for execution, wherein the write command references data to be written to a rotating magnetic recording medium of the magnetic disk drive;

determining that an expected bit error rate in data that is to be written using a magnetic head and laser of the magnetic disk drive to a first write location of the rotating magnetic recording medium and is referenced by the write command is greater than a threshold bit error rate; and in response to said determining, postponing writing of the data to the first write location.

16. The computer-implemented method of claim 15, wherein determining that the expected bit error rate in data to be written to the first write location is greater than a threshold bit error rate comprises determining that performing the write command can cause a level of media degradation for the first write location to exceed a maximum allowable degradation level.

17. The computer-implemented method of claim 15, wherein determining that the expected bit error rate in data to be written to the first write location is greater than a threshold bit error rate comprises determining that performing the write command can cause a time value associated with the first write location to exceed a threshold value.

18. The computer-implemented method of claim 17, wherein the time value associated with the first write location comprises a recovery time at which media degradation of the first write location returns to a base degradation level.

19. The computer-implemented method of claim 17, wherein determining that performing the write command can cause the time value associated with the first write location to exceed a threshold value comprises retrieving a previous time value associated with the first write location from one of a list, a map, or a function of monitored write locations that have accumulated media degradation.

* * * * *